Patented Dec. 19, 1950

UNITED STATES PATENT OFFICE 2,534,347

PRODUCTION OF POLY-SULFONE AMIDE POLYMERS

James Wotherspoon Fisher and Edward William Wheatley, Spondon, near Derby, England, assignors to British Celanese Limited, a corporation of Great Britain No Drawing. Application February 17, 1950, Serial No. 144,854. In Great Britain March 7, 1949

4 Claims. (Cl. 260—79)

This invention relates to improvements in the production of polymers, and is more particularly concerned with the production of polymers containing the sulphone group.

Various proposals have been made for the manufacture of polymers by reaction of a dicarboxylic acid with a diamine, either the diamine or the dicarboxylic acid containing a thioether group, in order to produce a polyamide containing the sulphide or thio-ether linkage. Again it has been proposed to produce the corresponding polyamide sulphone by reacting a sulphone dicarboxylic acid such as sulphone dibutyric acid with a diamine such as hexamethylene diamine. The sulphone polymer melts at a higher temperature than the corresponding thio-ether polymer and hence, in order to keep the polymer molten during the condensation, it is necessary to have higher temperatures than are necessary during the production of the polymer containing the thio-ether group. In some cases such higher temperatures lead to discoloration and even decomposition of the polymer. If it is attempted to convert the polymer containing the thio-ether group to the corresponding polymer containing the sulphone group by the classical methods of oxidising thio-ethers to sulphones, e. g. by the use of permanganate, it is found that the product is generally very unstable to heat.

We have found that such thio-ether polymers may be readily converted to the corresponding sulphone polymers by oxidation in an aqueous lower fatty acid of a high concentration by means of hydrogen peroxide or a substance yielding hydrogen peroxide. While both acetic acid and propionic acid may be used, we find that better results are obtained using formic acid, for example an aqueous formic acid of 70–95% strength, or by using a mixture of formic acid and acetic acid of high concentration, for example a mixture of the two acids containing upwards of 40% of formic acid and diluted with a small quantity of water, e. g. up to 25% of water based on the combined weights of the two acids. A convenient mixture to use is that obtained by adding to 85% aqueous formic acid the calculated quantity of acetic anhydride to combine with the 15% water therein. Having dissolved the polymer in such a solvent mixture, the desired amount of hydrogen peroxide can be added, e. g. at 30–50% concentration. Generally polyamide sulphones such as those referred to above are insoluble in formic acid of such a concentration so that as the oxidation is completed the polymer product goes out of solution. The hydrogen peroxide used for the oxidation may be used as an aqueous solution, for example of 30 or 60 or 90% concentration. Alternatively addition products of hydrogen peroxide, such as the solid sodium carbonate addition product $2Na_2CO_3.3H_2O_2$ may be used.

The invention may be applied to the production of a sulphone polymer from any suitable polyamide thio-ether obtainable by condensing a diamine and a dicarboxylic acid, one of which contains the thio-ether group. Suitable acids and diamines for this purpose are 4-thia-pimelic acid, 5-thia-azelaic acid, 5-thia-nonane-1.9-dicarboxylic acid, dibenzyl thio-ether 4.4′-dicarboxylic acid, $\alpha.\omega$-bis-(phenyl-thio)-alkane 4.4′-dicarboxylic acids, for example $\alpha.\beta$-bis-(phenyl-thio)-ethane 4.4′-dicarboxylic acid, diphenyl thio-ether 4.4′-dicarboxylic acid, carboxy-cyclohexyl-thio-glycollic acid (obtained by addition of thio-glycollic acid to $\Delta^3$-tetrahydrobenzonitrile followed by saponification), 1.5-diamino-3-thiapentane, 1.7-diamino-4-thia-heptane, 1.11-diamino-6-thia-undecane and 4.4′-diamino-dibenzyl thio-ether.

The proportion of water in the reaction medium, including that brought in by the hydrogen peroxide, should be sufficiently small so that the polymer remains in solution throughout the oxidation, and precipitation, if it occurs at all, occurs only at the end of the oxidation. The concentration of the two preferred media, namely formic acid and a mixture of formic and acetic acids, may be adjusted so that the polymer precipitates under the reaction conditions at the end of the oxidation or precipitates on cooling the reaction medium. With still lower concentrations of water the reaction product may stay in solution even after cooling. In such cases precipitation may be achieved by addition of water or other non-solvent miscible with the formic or formic and acetic acids.

The following examples illustrate the invention:

Example 1

The salt or hexamethylene diamine and 4-thiapimelic acid was heated in the melt under nitrogen for 2 hours at 220° C., followed by 1 hour at 250–260° C., both at atmospheric pressure, and then for a further hour at 250–260° C. under an absolute pressure of 2 mms. of mercury. The product, which was light-coloured and very hard, had a melting point of 203–205° C. and readily gave fibres. It had an intrinsic viscosity of 0.49. 50 parts of the finely ground polyamide thioether so prepared were dissolved in 500 parts of 85% aqueous formic acid. 90 parts of 30% aqueous hydrogen peroxide were then added slowly with occasional stirring. The final solution was allowed to stand at 20° C. for 3 hours. After half an hour a heavy white precipitate developed. The product was diluted with water, filtered, well washed with acetone and dried in air. It was a white powdery solid having a melting point of 250–255° C., an intrinsic viscosity of 0.48, and readily formed filaments from the melt.

Attempts to obtain the same polymer by condensation of hexamethylene diamine with 3.3'-sulphone-dipropionic acid were uniformly unsuccessful and resulted in a great deal of decomposition despite great care that the reaction should be carried out in an atmosphere which was entirely inert.

*Example 2*

The oxidation was carried out in exactly the same way as in Example 1 except that the formic acid solution of the polymer was warmed to 40° C. before addition of the hydrogen peroxide. The temperature began to rise almost immediately and exterior cooling was resorted to until all the peroxide had been added and was then discontinued. The temperature remained steady at 40° C. for a further ¼ hour and after 10 minutes a copious white solid precipitated. This was isolated and washed as in Example 1. The product was again a white powdery solid and had a melting point of 252–254° C.

*Example 3*

The hexamethylene diamine salt of 5-thiaazelaic acid was heated at 190–200° C. for 3 hours under nitrogen. After 2½ hours the melt showed signs of resolidification and the temperature was raised to 240–250° C. and the pressure reduced to 2 mms. of mercury. After 2 hours under these conditions the heating was discontinued. The product was a hard mass, melting point 195–200° C., which yielded long fine filaments from the melt. The product had an intrinsic viscosity of 0.62. The finely ground product was dissolved in 85% aqueous formic acid as in the preceding examples, and the solution warmed to 50° C. Hydrogen peroxide was then added as previously described. No precipitation of the polymer occurred at this temperature and the solution was allowed to cool and a fine white precipitate was thrown out. After dilution with water, the polymer was filtered off, washed and dried. Its melting point was 244–248° C. and it readily formed filaments from the melt.

*Example 4*

The condensation of hexamethylene diamine with 5-thia-nonane-1.9-dicarboxylic acid was carried out by first forming the salt and then heating the salt as described in Example 3 for the polymer from 5-thia-azelic acid. The product had a melting point of 178–182° C. and possessed good fibre-forming properties.

50 parts of the poly-thio-ether-amide were dissolved in 500 parts by weight of a solvent mixture obtained by adding to 85% aqueous formic acid the calculated amount of acetic anhydride to combine with all the water. The solution was raised to 60° C. and 30% aqueous hydrogen peroxide added in a quantity equal to twice the theoretical amount required for oxidation. The mixture was maintained at 60° C. for 3 hours to complete the oxidation. The resulting solution was then cooled, diluted with water and poured into excess dilute ammonium hydroxide. A copious white solid precipitated which was washed with water and acetone and dried. The product was a light-coloured powdery solid of melting point 206–208° C., insoluble in water, acetone and methanol, soluble in cresol and formic acid, and readily formed fibres.

*Example 5*

47 parts by weight of 5-thia-nonane-1.9-dicarboxylic acid were dissolved in dioxane and to this solution were added 20 parts by weight of 60% ethylene diamine in dioxane. The salt precipitated as a white solid. The mother liquor was decanted and the salt dissolved in hot methanol. The alcoholic solution was then cooled and diluted with excess ether, when the salt deposited as a fine white precipitate, melting point 133–134° C. The salt was heated under nitrogen at 200–210° C. for ½ hour. It melted readily to a clear mobile liquid which gradually increased in viscosity. It tended to resolidify and the temperature was then raised to 230° C. to melt the polymer. Heat treatment at 230° C. and atmospheric pressure continued for ½ hour and was followed by a heat treatment for ½ hour again at 230° C. but at 2 mms., and finally for 5 hours at 240° C. and 2 mms. The polymer thus formed had a melting point of 214–215° C. and was fibre-forming.

50 parts of this polymer were dissolved in 500 parts of the solvent mixture referred to in Example 4 and the oxidation carried out as described in that example. The melting point of the final polymer was 233° C. and the polymer was fibre-forming.

*Example 6*

62 parts of 7-thia-tridecane-1.13-dicarboxylic acid and 25 parts of hexamethylene diamine were dissolved in separate portions of dioxane and the two solutions mixed. A white precipitate was formed immediately and was filtered off and washed with dioxane. It had a melting point of 102–105° C. It was heated at 180° C. under nitrogen for ½ hour and then for a further ½ hour at 220° C. under a pressure of 2 mms. The polymer was a hard brittle mass, melting point 156–158° C., and yielded strong filaments.

50 parts of this polymer were dissolved in 500 parts of the solvent mixture referred to in Example 4 and the oxidation carried out as in that example. The final product, the poly-sulphone-amide, was a white powdery solid melting at 200–205° C., and yielded filaments from the melt.

Having described our invention, what we desire to secure by Letters Patent is:

1. Process for the production of a linear poly-sulphone-amide, which comprises oxidizing the corresponding linear poly-thio-ether-carboxylic-amide containing the thio-ether and carboxylic-amide groups in the linear chain by means of a peroxide in a reaction medium consisting of a mixture of formic and acetic acids containing up to 25% by weight of water on the combined weights of the two acids.

2. Process according to claim 1 wherein the oxidation is effected with hydrogen peroxide.

3. Process according to claim 1 wherein the oxidation is effected at a temperature of 50 to 100° C.

4. Process according to claim 2 wherein the oxidation is effected at a temperature of 50 to 100° C.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
|---|---|---|
| 2,158,064 | Carothers | May 16, 1939 |
| 2,201,884 | Carothers | May 21, 1940 |